(12) United States Patent
Park et al.

(10) Patent No.: US 7,663,335 B2
(45) Date of Patent: Feb. 16, 2010

(54) SINGLE-PHASE INDUCTION MOTOR

(75) Inventors: Jin Soo Park, Inchun-si (KR); Byung Taek Kim, Ansan-si (KR); Sung Ho Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 711 days.

(21) Appl. No.: 11/202,329

(22) Filed: Aug. 12, 2005

(65) Prior Publication Data
US 2006/0055364 A1 Mar. 16, 2006

(30) Foreign Application Priority Data
Sep. 15, 2004 (KR) .................. 10-2004-0073853

(51) Int. Cl.
H02P 1/42 (2006.01)
H02P 1/44 (2006.01)
H02P 23/00 (2006.01)
H02P 25/00 (2006.01)
H02P 25/18 (2006.01)
H02P 29/00 (2006.01)

(52) U.S. Cl. .................. 318/788; 318/774; 318/778
(58) Field of Classification Search ................ 318/788, 318/774, 778
See application file for complete search history.

(56) References Cited

U.S. PATENT DOCUMENTS

| 3,696,281 A | 10/1972 | Gramkow et al. |
| 3,746,951 A | 7/1973 | Hohman |
| 4,574,229 A | 3/1986 | Kim |
| 4,734,601 A | 3/1988 | Lewus |
| 4,847,580 A | 7/1989 | Morishita et al. |
| 4,853,569 A | 8/1989 | Lewus |
| 5,391,971 A | 2/1995 | Yamada et al. |
| 5,451,853 A | 9/1995 | Itoh |
| 5,561,357 A | 10/1996 | Schroeder |
| 5,589,753 A | 12/1996 | Kadah et al. |
| 5,598,080 A | 1/1997 | Jensen et al. |
| 6,320,348 B1 | 11/2001 | Kadah |
| 7,061,204 B2 * | 6/2006 | Unno .......................... 318/786 |

(Continued)

FOREIGN PATENT DOCUMENTS

DE 1238561 9/1960

(Continued)

OTHER PUBLICATIONS

English language Abstract of JP 8-28487.

(Continued)

Primary Examiner—Walter Benson
Assistant Examiner—Erick Glass
(74) Attorney, Agent, or Firm—Birch, Stewart, Kolasch & Birch, LLP

(57) ABSTRACT

A single-phase induction motor comprises a power consumption prevention device, which includes a current signal transfer element and a switching element. The switching element is turned on/off according to the current signal received from the current signal transfer element. The power consumption prevention device prevents current flow to a start device when the motor runs in normal mode, and thus avoids unnecessary power consumption by the start device when the motor runs in normal mode, thereby preventing a reduction in the efficiency of the single-phase induction motor due to the unnecessary power consumption.

5 Claims, 3 Drawing Sheets

U.S. PATENT DOCUMENTS

| | | | |
|---|---|---|---|
| 7,100,382 B2 * | 9/2006 | Butler et al. | 62/126 |
| 2002/0005700 A1 | 1/2002 | Dubhashi | |
| 2006/0273752 A1 * | 12/2006 | Duarte et al. | 318/791 |

FOREIGN PATENT DOCUMENTS

| | | |
|---|---|---|
| EP | 0044244 | 9/1984 |
| EP | 0571956 | 12/1993 |
| EP | 1619786 | 1/2006 |
| GB | 1183294 | 3/1970 |
| JP | 48-030004 | 4/1973 |
| JP | 58-029395 | 2/1983 |
| JP | 59-136023 | 8/1984 |
| JP | 4-289786 | 10/1992 |
| JP | 4-289787 | 10/1992 |
| JP | 6-319282 | 11/1994 |
| JP | 8-28487 | 1/1996 |
| JP | 2001-339918 | 12/2001 |
| JP | 2005-245068 | 9/2005 |
| KR | 6-319282 | 11/1994 |
| KR | 2003-0069712 | 8/2003 |
| SU | 127743 | 5/1959 |
| SU | 1309228 | 5/1987 |
| SU | 1653112 | 5/1991 |
| WO | 2004/051836 | 6/2004 |
| WO | 2004/051837 | 6/2004 |

OTHER PUBLICATIONS

English Language Abstract KR 6-319282.
English Language Abstract of KR 2003-0069712.
English language Abstract of JP 4-289787, Oct. 14, 1992.
English language Abstract of JP 2001-339918, Dec. 7, 2001.
English language Abstract of JP 4-289786, Oct. 14, 1992.
English language Abstract of JP 2005-245068, Sep. 8, 2005.
English Language Abstract KR 6-319282, Nov. 15, 1994.
English Language Abstract of KR 2003-0069712, Aug. 27, 2003.
English language Abstract of JP 8-28487, Jan. 30, 1996.
English language Abstract of German No. 1238561, Sep. 30, 1960.

* cited by examiner

SINGLE-PHASE INDUCTION MOTOR

BACKGROUND OF THE INVENTION

1. Field of the Invention

The present invention relates to a single-phase induction motor, and more particularly to a single-phase induction motor provided with means for preventing a small amount of current from flowing to a start device composed of a PTC or the like when the motor runs in normal mode, so as to prevent a reduction in the efficiency of the motor due to power consumption by the start device in normal running mode of the motor.

2. Description of the Related Art

First, a conventional single-phase induction motor is described with reference to FIG. 1.

FIG. 1 is a circuit diagram of a conventional single-phase induction motor. As shown in FIG. 1, the conventional single-phase induction motor is driven by a power source E, and includes a main winding M, an auxiliary winding S, a run capacitor Cr connected in series with the auxiliary winding S, and a Positive Thermal Coefficient element (hereinafter, referred to as a "PTC") connected in parallel with the run capacitor Cr. A start capacitor Cs may be connected in series with the start device.

The PTC, which is used as a start device, is an element whose resistance varies depending on temperature. The PTC has a high resistance at high temperature and a low resistance at low temperature.

The conventional single-phase induction motor configured as described above operates in the following manner.

When the motor starts up with power supplied from the power source E, the resistance of the PTC is low, allowing a current provided to the auxiliary winding S to pass through the PTC and the start capacitor Cs. Accordingly, a high start torque is produced when the motor starts.

On the other hand, when the motor runs in normal mode after a predetermined time from the start of the motor, the temperature of the PTC is increased so that it has a very high resistance, thereby opening a start device connection line through which the PTC is connected to the circuit. As the start device connection line is opened, the current provided to the auxiliary winding S flows through the run capacitor Cr, so that the main winding M, the auxiliary winding S, and the run capacitor Cr produce magnetic fields, and the interaction between the produced magnetic fields and a rotor (not shown) causes the rotor to rotate at synchronous speed.

Ideally, the resistance of the PTC reaches infinite when the motor is in normal running mode, so that no current flows through the PTC. However, practically, a small amount of leakage current flows through the PTC when the motor is in normal running mode, and the leakage current causes unnecessary power consumption by the PTC, thereby reducing the overall efficiency of the motor.

One solution to this problem is a single-phase induction motor including means for preventing power consumption by a PTC when the motor is in normal running mode.

FIG. 2 is a circuit diagram of a conventional single-phase induction motor provided with means for preventing power consumption by a start device in normal running mode. As shown in FIG. 2, the single-phase induction motor includes a main winding M, an auxiliary winding S, a search coil 1, and a triac 2. The main winding M produces time-varying magnetic flux, and the produced magnetic flux induces a voltage in the search coil 1. The voltage induced in the search coil 1 is applied to the gate of the triac 2, which is a semiconductor switching element.

When the motor starts up, a large amount of current is provided to the main winding M, so that a high voltage is induced in the search coil 1, thereby turning on the triac 2. As the triac 2 is turned on, a current provided to the auxiliary winding S flows through the triac 2 and a resistor R, which corresponds to a start device.

On the other hand, when the motor runs in normal mode, a small amount of current is provided to the main winding M, so that a low voltage is induced in the search coil 1, thereby turning off the triac 2. As the triac 2 is turned off, all the current provided to the auxiliary winding S flows through the run capacitor Cr, thereby preventing power consumption by the PTC (corresponding to the resistor R) when the motor runs in normal mode.

However, in the case of using the above means for preventing power consumption by the PTC when the motor is in normal running mode, it is difficult to install the search coil and also to install an additional device for inducing a voltage through time-varying magnetic fields, consequently reducing the installation and overall efficiency of the motor.

SUMMARY OF THE INVENTION

Therefore, the present invention has been made in view of the above problems, and it is an object of the present invention to provide a single-phase induction motor that prevents current flow to a start device to prevent unnecessary power consumption by the start device in normal running mode, wherein it is easy to implement a device for preventing unnecessary power consumption by the start device, thereby increasing the installation and overall efficiency of the motor.

In accordance with one aspect of the present invention, the above and other objects can be accomplished by the provision of a single-phase induction motor comprising a main winding, an auxiliary winding, and a run capacitor, the motor further comprising a start device for producing a high start torque when the motor starts; and power consumption prevention means for preventing current from flowing to the start device to prevent power consumption by the start device when the motor runs in normal mode.

Preferably, the power consumption prevention means comprises a current signal transfer element for transferring a current signal; and a switching element for controlling current flow to the start device according to the current signal received from the current signal transfer element. When the motor runs in normal mode, the switching element is turned off, thereby preventing current from flowing to the start device.

Preferably, the current signal transfer element comprises a current transformer including a primary coil and a secondary coil, a current being induced in the secondary coil according to the amount of a current provided to the primary coil, the current transformer applying the current induced in the primary coil to an external element.

When the current transformer is used as the current signal transfer element, the current transformer is preferably connected in series with one end of the main winding or with one terminal of a power source. Preferably, the switching element is a triac having a gate, wherein a current induced in the secondary coil of the current transformer is applied to the gate of the triac, and the triac is turned on/off according to the amount of the current applied to the gate thereof. Alternatively, the switching element is a relay which is turned on/off according to the amount of a current received from the secondary coil of the current transformer.

In accordance with another aspect of the present invention, the above and other objects can be accomplished by the provision of a single-phase induction motor comprising a main winding, an auxiliary winding, and a run capacitor, the motor further comprising a start device for producing a high start torque when the motor starts; and a solenoid switch for controlling current flow to the start device so that current is prevented from flowing to the start device to prevent power consumption by the start device when the motor runs in normal mode.

Preferably, the solenoid switch includes a coil, through which a current provided to the main winding M flows, for allowing or preventing current flow to the start device according to the amount of the current flowing through the coil.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
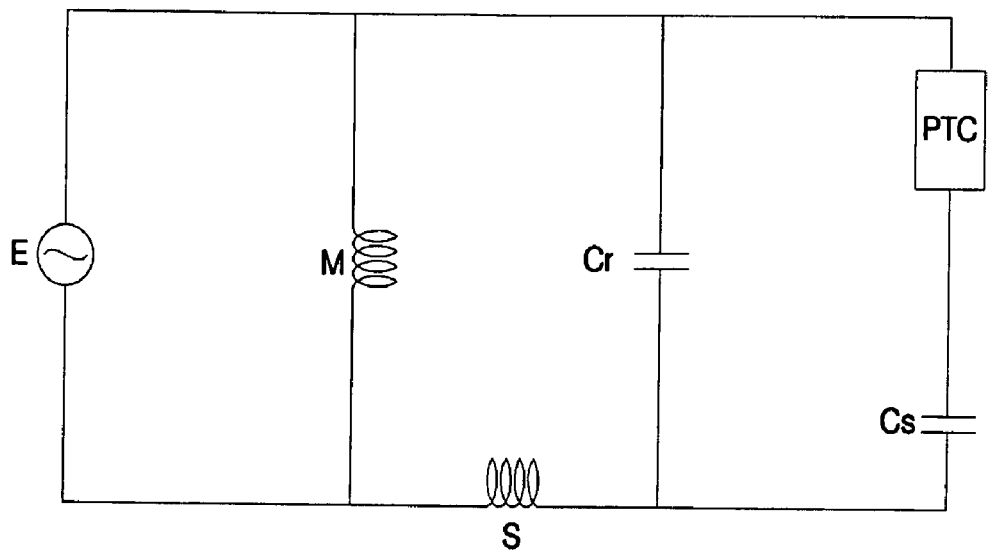
FIG. 1 is a circuit diagram of a conventional single-phase induction motor.
Figure 2:
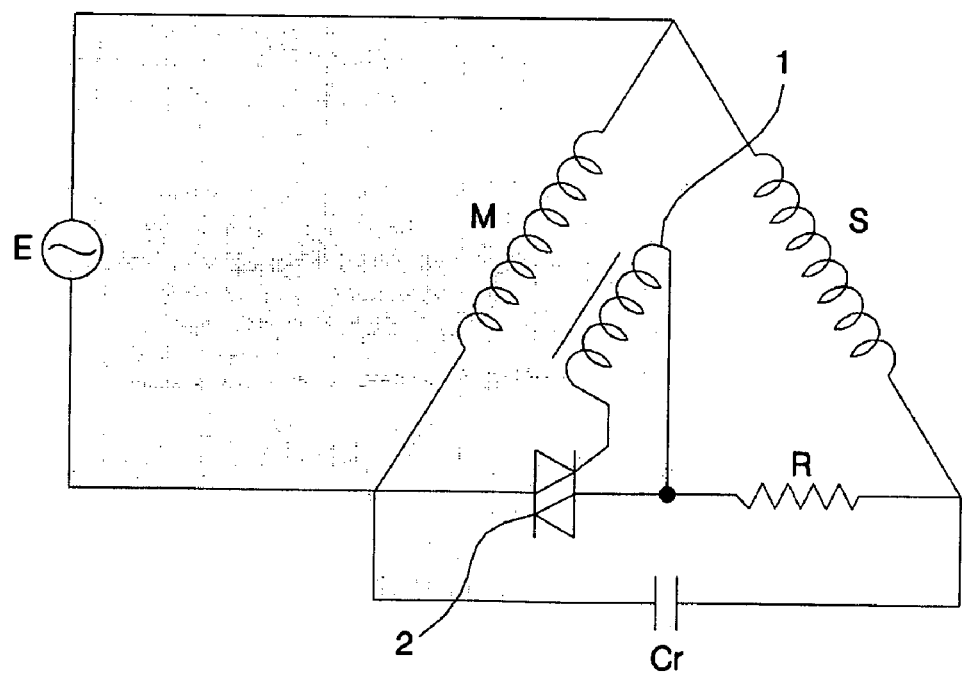
FIG. 2 is a circuit diagram of a conventional single-phase induction motor provided with means for preventing power consumption by a start device in normal running mode.

Embodiments of a single-phase induction motor according to the present invention will now be described in detail with reference to the accompanying drawings. The same or similar elements are referred to by the same terms in the description of the embodiments and they are also denoted by the same reference numerals in the drawings.

FIGS. 3 to 6 are circuit diagrams of single-phase induction motors according to first to fourth embodiments of the present invention. The single-phase induction motors according to the present invention commonly include a main winding M, an auxiliary winding S, a run capacitor Cr, and a start device (for example, a PTC) connected in parallel with the run capacitor Cr. The single-phase induction motor may further include a start capacitor Cs connected in series with the start device.

Figure 3:
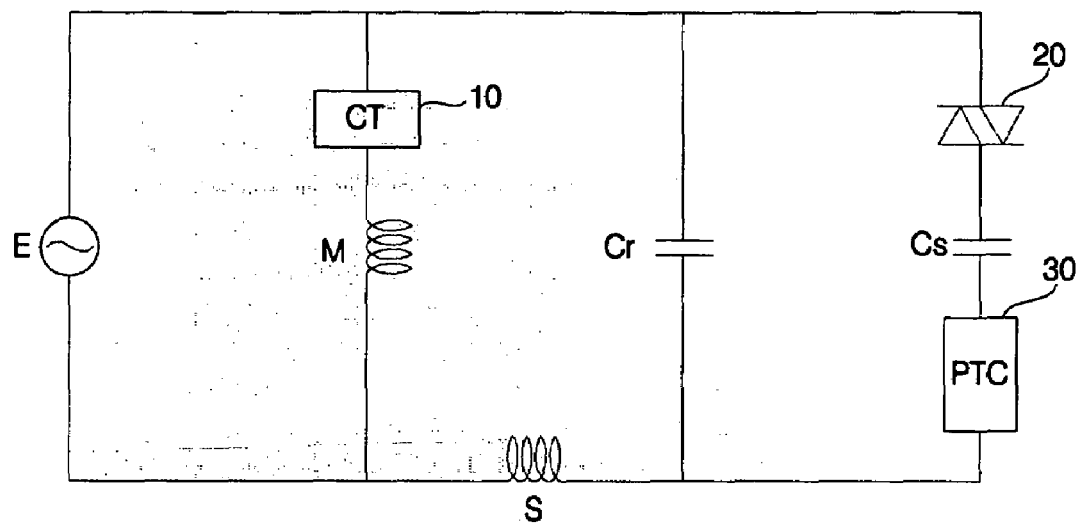
FIG. 3 is a circuit diagram of a single-phase induction motor according to a first embodiment of the present invention.

FIG. 3 is a circuit diagram of a single-phase induction motor according to the first embodiment of the present invention. In this embodiment, the single-phase induction motor further includes means for preventing the start device from consuming power by inhibiting current from flowing through the start device when the motor runs in normal mode (i.e., induction mode). The unnecessary power consumption prevention means includes a current transformer 10 and a switching element as shown in FIG. 3. The switching element includes a triac 20 in this embodiment.

The current transformer 10 is connected in series with one end of the main winding M, so that a current provided to the main winding M flows to the primary coil of the current transformer 10, and a current, which is induced in the secondary coil of the current transformer 10 according to the amount of the current provided to the primary coil thereof, is provided to the gate of the triac 20.

Figure 4:
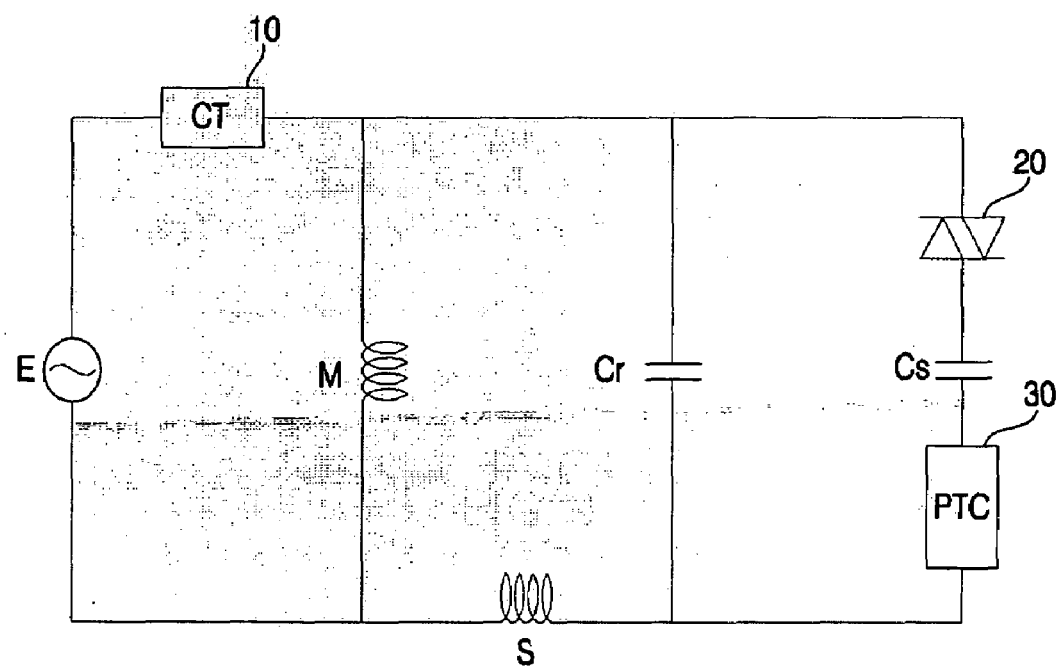
FIG. 4 is a circuit diagram of a single-phase induction motor according to a second embodiment of the present invention.

FIG. 4 is a circuit diagram of a single-phase induction motor according to the second embodiment of the present invention. As shown in FIG. 4, the single-phase induction motor according to this embodiment also includes a switching element and a current transformer 10, which is used to transfer a current signal, as a switching signal, to the switching element. The switching element includes a triac 20 in this embodiment. In particular, the current transformer 10 is connected in series with one terminal of a power source E, so that a current from the power source is provided to the primary coil of the current transformer 10.

Figure 5:
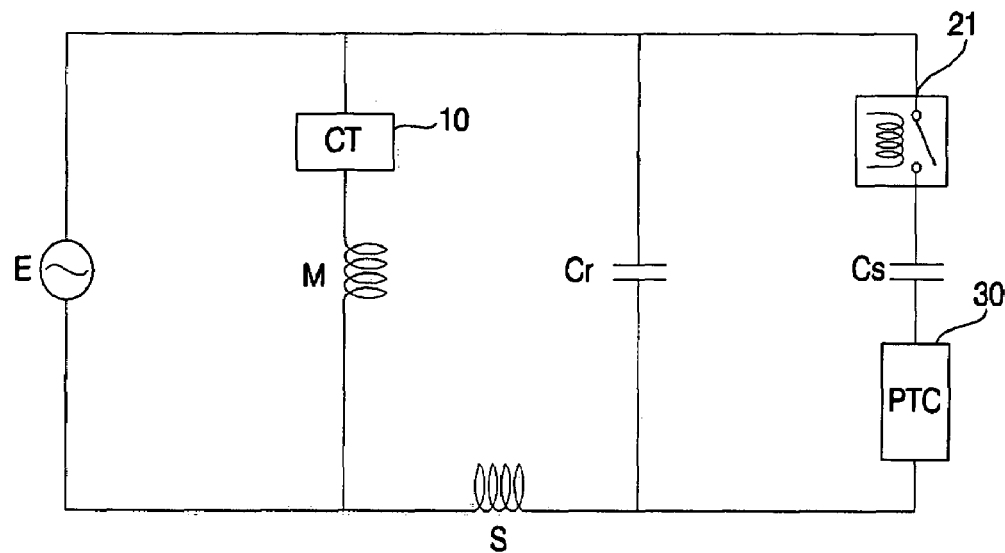
FIG. 5 is a circuit diagram of a single-phase induction motor according to a third embodiment of the present invention.

FIG. 5 is a circuit diagram of a single-phase induction motor according to the third embodiment of the present invention. As shown in FIG. 5, the single-phase induction motor according to this embodiment uses a current transformer 10 to transfer a current signal to a switching element in the same manner as in the above embodiments. The motor according to this embodiment is characterized in that the switching element includes a relay 21 that is turned on/off according to the amount of current received from the secondary coil of the current transformer 10.

Figure 6:
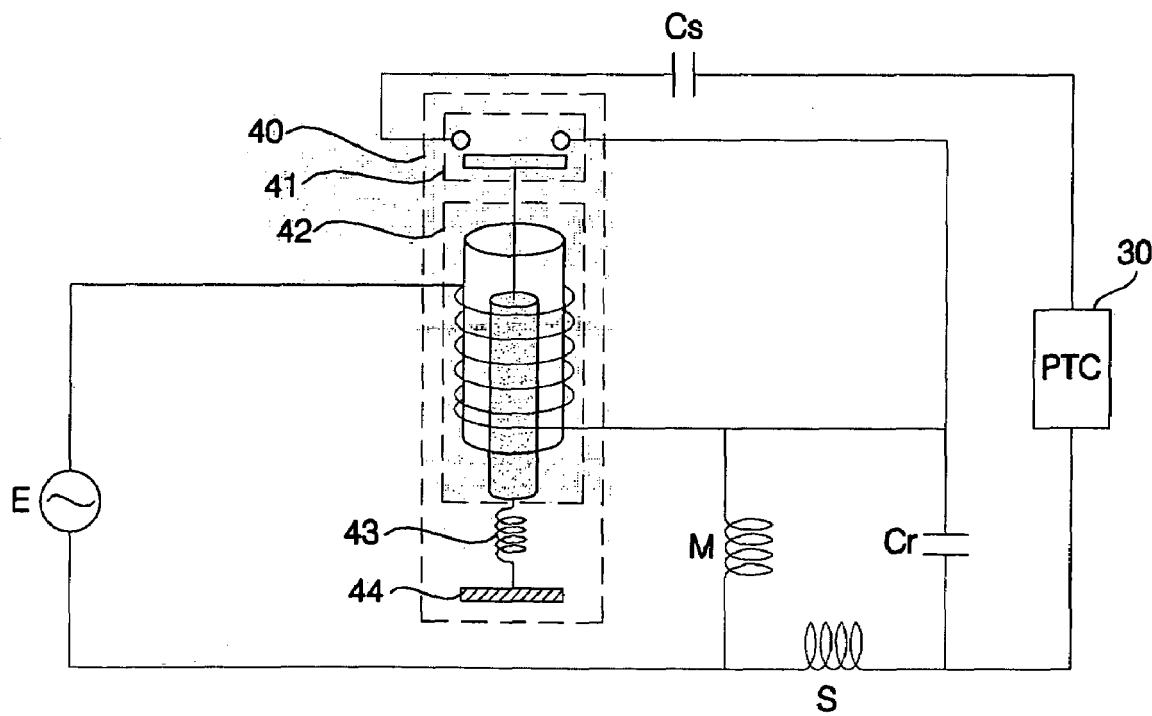
FIG. 6 is a circuit diagram of a single-phase induction motor according to a fourth embodiment of the present invention.

FIG. 6 is a circuit diagram of a single-phase induction motor according to the fourth embodiment of the present invention. As shown in FIG. 6, the single-phase induction motor according to this embodiment also includes a main winding M, an auxiliary winding S, a run capacitor Cr, a start capacitor Cs, and a start device, and further includes a solenoid switch 40 as means for preventing the start device from consuming power when the motor runs in normal mode.

The solenoid switch 40 includes a switching portion 41, a solenoid 42, a spring 43, and a plate 44. As is typical, the solenoid 42 includes a coil wound around a metal cylinder that surrounds a core. The switching portion 41, which is provided above the solenoid 42, is turned on/off to open or close a start device connection line through which the start capacitor Cs and the PTC 30 are connected in series. The spring 43 and the plate 44, which has a specific weight, are provided under the solenoid 42. The switching portion 41 for closing or opening the start device connection line is connected in series with the start device so that current is prevented from flowing to the start device when the switching portion 41 is turned off.

As shown in FIGS. 3 to 6, the start device may include a PTC 30.

The configuration and operation of the single-phase induction motors according to the first to fourth embodiments of the present invention will now be described in more detail with reference to FIGS. 3 to 6.

First, a detailed description will be given of the single-phase induction motor according to the first embodiment. As shown in FIG. 3, the single-phase induction motor according to this embodiment includes a main winding M, an auxiliary winding S, a run capacitor Cr, a start capacitor Cs, and a start device. As power is supplied from a power source E, the main winding M and the auxiliary winding S produce magnetic fields, and the interaction of the produced magnetic fields produces a rotating torque. The run capacitor Cr is connected in series with the auxiliary winding S, and the start device is connected in parallel with the run capacitor Cr. For example, the start device includes a PTC 30 as shown in FIG. 3.

The single-phase induction motor according to this embodiment further includes a current transformer 10 and a triac 20 to prevent unnecessary power consumption, which is caused by a small amount of current flowing through the PTC 30 in the conventional motor when it runs in normal mode, consequently increasing the overall efficiency of the motor.

The current transformer 10 is similar in configuration to a general voltage transformer. That is, the current transformer 10 includes a primary coil with a smaller number of turns wound on a laminated core and a secondary coil with a larger number of turns wound thereon. A current is induced in the secondary coil according to the amount of current applied to the primary coil. The amount of the current induced in the secondary coil is inversely proportional to the number of turns of the secondary coil.

The triac 20 is connected in series with the PTC 30. The current induced in the secondary coil of the transformer 10 is provided to the gate of the triac 20, so that the triac 20 is turned on/off according to the amount of the current provided to the gate.

The first embodiment is characterized in that the current transformer 10 is connected in series with one end of the main winding M so that a current flowing to the main winding M with power supplied from the power source E is provided to the primary coil of the current transformer 10.

When the motor starts, a current from the power source E is split into the main winding M and the auxiliary winding S. When the motor starts, a large amount of current flows to the main winding M, and therefore a large amount of current is applied to the primary coil of the current transformer 10.

As a large amount of current is applied to the primary coil of the current transformer 10, a large amount of current is induced in the secondary coil thereof. As a large amount of induced current is applied to the gate of the triac 20, the triac 20 is turned on. In addition, when the motor starts, the PTC 30 has a low resistance, so that the current split into the auxiliary winding S flows through a start device connection line through which the triac 20, the start capacitor Cs, and the PTC 30 are connected in series.

In this manner, the current of the auxiliary winding S flows through the start capacitor Cs at the start of the motor, thereby improving start-up performance of the motor.

After a predetermined time from the start of the motor, the motor runs in normal mode, in which the amount of current flowing from the power source E to the main winding M is small. As the motor operates for a predetermined time, the temperature of the PTC 30 is increased, so that the resistance of the PTC 30 is also increased. Accordingly, the total equivalent resistance of the start device connection line is also increased, which changes current flow so that most of the current provided to the auxiliary winding S flows through the run capacitor Cr.

In the conventional single-phase induction motor, a small amount of leakage current flows through the PTC 30 even when the motor runs in normal mode, so that the PTC 30 consumes unnecessary power, reducing the efficiency of the motor.

However, the single-phase induction motor according to the first embodiment of the present invention employs the current transformer 10 and the triac 20 to prevent the unnecessary power consumption by the PTC 30. In detail, when the motor runs in normal mode, the amount of current applied to the main winding M is reduced as described above, so that the amount of current flowing to the primary coil of the current transformer 10 is also reduced, and accordingly the amount of current in the secondary coil, which is induced by the primary coil, is also reduced.

As the amount of current induced in the secondary coil is reduced, the amount of current provided from the secondary coil of the current transformer 10 to the gate of the triac 20 is also reduced, thereby turning off the triac 20. As the triac 20 is turned off, current is prevented from flowing through the start capacitor Cr and the PTC 30 when the motor runs in normal mode. Accordingly, the motor according to the first embodiment prevents unnecessary power consumption, which is caused in the conventional motor by a small amount of current flowing through the start capacitor Cr and the PTC 30 when the motor runs in normal mode, consequently increasing the overall efficiency of the motor.

Next, a detailed description will be given of the single-phase induction motor according to the second embodiment. As shown in FIG. 4, the single-phase induction motor according to this embodiment includes a main winding M, an auxiliary winding S, a run capacitor Cr, a start capacitor Cs, and a start device. In the same manner as in the first embodiment, the main winding M and the auxiliary winding S produce magnetic fields, and the interaction of the produced magnetic fields produces a rotating torque. The run capacitor Cr is connected in series with the auxiliary winding S, and the start device is connected in parallel with the run capacitor Cr. For example, the start device includes a PTC 30 as shown in FIG. 4.

The single-phase induction motor according to this embodiment further includes a current transformer 10 and a triac 20 to prevent current from flowing through the PTC 30 when the motor runs in normal mode. The current transformer 10 is connected in series with one terminal of the power source E, so that a current from the power source E is provided to the primary coil of the current transformer 10 when the motor is activated.

When the motor runs in normal mode, the amount of current applied to the primary coil of the current transformer 10 is reduced, and therefore the amount of current induced in the secondary coil by the current of the primary coil is also reduced. As the amount of current induced in the secondary coil is reduced, the amount of current provided from the secondary coil of the current transformer 10 to the gate of the triac 20 is also reduced, thereby turning off the triac 20. As the triac 20 is turned off, current is prevented from flowing to the PTC 30 when the motor runs in normal mode.

Now, a detailed description will be given of the single-phase induction motor according to the third embodiment. As shown in FIG. 5, the single-phase induction motor according to this embodiment includes a main winding M, an auxiliary winding S, a run capacitor Cr, a start capacitor Cs, and a start device (for example, a PTC 30) as in the above embodiments.

The single-phase induction motor according to the third embodiment of the present invention further includes a current transformer 10 and a switching element (a relay 21 in this embodiment), which serve as means for preventing unnecessary power consumption by the PTC 30 when the motor runs in normal mode. The relay 21 is turned on/off depending on the intensity of a magnetic field produced by a current received from the secondary coil of the current transformer 10. The current transformer 10 and the switching element (i.e., the relay 21) operate in the same manner as in the above embodiments to prevent current from flowing to the PTC 30 when the motor runs in normal mode.

In this embodiment, the current transformer 10 may be connected in series with one terminal of the power source E, so that a current from the power source E is applied to the primary coil of the current transformer 10. Alternatively, the current transformer 10 may be connected in series with one end of the main winding M, so that a current provided to the main winding M is applied to the primary coil of the current transformer 10.

A detailed description will now be given of the single-phase induction motor according to the fourth embodiment. As shown in FIG. 6, the single-phase induction motor according to this embodiment includes a main winding M, an auxiliary winding S, a run capacitor Cr connected in series with the auxiliary winding S, and a PTC 30 connected in parallel with the run capacitor Cr. The single-phase induction motor may further include a start capacitor Cs connected in series with the PTC 30 as in the above embodiments. These elements of the motor also operate in the same manner as those of the above embodiments.

The single-phase induction motor according to the fourth embodiment uses a solenoid switch 40 as means for preventing the PTC 30 from consuming power by inhibiting current from flowing to the PTC 30 when the motor runs in normal mode.

The solenoid switch 40 includes a switching portion 41, a solenoid 42, a spring 43, and a plate 44. As is typical, the solenoid 42 includes a coil wound around a metal cylinder that surrounds a core. The switching portion 41, which is provided above the solenoid 42, is turned on/off to open or close a start device connection line through which the start capacitor Cs and the PTC 30 are connected in series. The spring 43 and the plate 44, which has a specific weight, are provided under the solenoid 42.

If a small amount of current flows through the coil of the solenoid 42, the core of the solenoid is forced to move down due to the weight of the plate 44, thereby keeping the switching portion 41 off. On the contrary, if a large amount of current flows through the coil of the solenoid 42, the coil produces strong magnetic fields, forcing the core to move up and enter the metal cylinder. Then, the core is fully inserted and stabilized in the metal cylinder, so that the switching portion 41, which is connected with the core, is kept on, closing the start device connection line.

According to the present invention, a coil, through which a current provided from the power source E or a current provided to the main winding M flows, is wound to form the solenoid 42. FIG. 6 illustrates a specific example where a coil, through which a current provided to the main winding M flows, is wound to form the solenoid 42.

The switching portion 41 formed on one end of the start device connection line, through which the start capacitor Cs and the PTC 30 are connected, is turned on/off according to the amount of current flowing through the solenoid 42, so as to control or prevent the flow of current to the PTC 30 when the motor runs in normal mode.

When the motor starts, a large amount of current flows from the power source E to the main winding M, so that a large amount of current flows through the coil of the solenoid 42.

Accordingly, the coil of the solenoid 42 produces strong magnetic fields to force the core to move up, so that the switching portion 41, which is provided above the solenoid 42, is kept on, closing the start device connection line through which the start capacitor Cs and the PTC 30 are connected in series.

On the other hand, when the motor starts, the PTC 30 has a low resistance, allowing the current applied to the auxiliary winding S to flow through the start device connection line.

When the motor runs in normal mode after a predetermined time from the start of the motor, the amount of current applied to the main winding M is reduced and accordingly the amount of current applied to the coil of the solenoid 42 is also reduced, so that the solenoid 42 produces weak magnetic fields.

Accordingly, when the motor runs in normal mode, the core of the solenoid 42 is pulled down due to the physical mechanism of the spring 43 and the plate 44 provided under the solenoid 42. As the core moves down, the switching portion 41, which is provided above the solenoid 42, is turned off, thereby preventing current from flowing to the start capacitor Cs and the PTC 30.

As apparent from the above description, the present invention provides a single-phase induction motor comprising a power consumption prevention device including a current signal transfer element and a switching element, which is turned on/off according to the current signal received from the current signal transfer element. Accordingly, the power consumption prevention device prevents current flow to a start device when the motor runs in normal mode, and thus avoids unnecessary power consumption by the start device when the motor runs in normal mode, thereby preventing a reduction in the efficiency of the single-phase induction motor due to the unnecessary power consumption.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The present disclosure relates to subject matter contained in Korean Application No. 10-2004-0073853, filed on Sep. 15, 2004, the contents of which are herein expressly incorporated by reference in its entirety.

What is claimed is:

1. A single-phase induction motor comprising a main winding, an auxiliary winding, and a run capacitor, the motor further comprising:

a start capacitor;

a start device to produce a high start torque when the motor starts, said start device including a positive thermal coefficient element (PTC) having a low resistance at low temperature; and a power consumption preventor to prevent current from flowing to the start device to prevent power consumption by the start device when the motor runs in normal mode, wherein the power consumption preventor comprises a current transformer including a primary coil and a secondary coil, the primary coil being connected in series with one end of the main winding and with another end of the primary coil being connected to a power source, to generate a current signal based on a current being induced in the secondary coil according to an amount of a current provided to the primary coil, wherein the current signal is transferred to a switching element, connected in series with the start capacitor and the PTC, to control current flow to the PTC, such that when the current signal is received from the secondary coil and when the motor runs in normal mode, the switching element turns off and prevents current from flowing to the PTC.

2. The motor according to claim 1, wherein the switching element is turned on/off according to the amount of a current received from the secondary coil of the current transformer.

3. The motor according to claim 1, wherein the switching element is a triac having a gate, wherein a current induced in the secondary coil of the current transformer is applied to the gate of the triac, and the triac is turned on/off according to the amount of the current applied to the gate thereof.

4. The motor according to claim 1, wherein the switching element is a relay which is turned on/off according to the amount of a current received from the secondary coil of the current transformer.

5. A single-phase induction motor comprising a main winding, an auxiliary winding, and a run capacitor, the motor further comprising:

a start device to produce a high start torque when the motor starts, said start device includes a positive thermal coefficient element (PTC); and a solenoid switch to control current flow to the start device to prevent power consumption by the start device when the motor runs in normal mode, said solenoid switch including a coil connected in series with one end of the main winding, wherein another end of the coil is connected with one end of a power source, the coil being provided to actuate a switching portion of the solenoid, which is connecting the PTC in parallel to a run capacitor depending on the amount of the current flowing through the coil.

* * * * *